United States Patent [19]

Bailey

[11] 3,788,239
[45] Jan. 29, 1974

[54] RAILROAD FREIGHT CAR DOOR TRACK AND THRESHOLD DESIGN

[75] Inventor: John D. Bailey, Orland Park, Ill.

[73] Assignee: Pullman Incorporated, Chicago, Ill.

[22] Filed: Dec. 20, 1971

[21] Appl. No.: 209,918

[52] U.S. Cl. .................................. 105/378, 49/467
[51] Int. Cl. ............................................. B61d 17/00
[58] Field of Search ........ 105/378, 409, 422; 16/71; 49/467–471

[56] References Cited
UNITED STATES PATENTS

| | | | |
|---|---|---|---|
| 2,429,182 | 10/1947 | Doke | 49/467 |
| 2,744,301 | 5/1956 | Viola, Jr. | 49/471 |
| 3,587,477 | 6/1971 | Ferris et al. | 105/378 |
| 2,930,332 | 3/1960 | Cook et al. | 105/378 |

Primary Examiner—Robert G. Sheridan
Assistant Examiner—Richard A. Bertsch
Attorney, Agent, or Firm—Hilmond O. Vogel et al.

[57] ABSTRACT

A threshold seal arrangement for a box car wherein the threshold is provided with a downward depending portion connecting with a lower outwardly extending horizontal flange portion, each of the threshold portions being spaced between the door and the side sill of the car and extending through the door posts, the lower extremity of the threshold plate having the afore-mentioned out-turned horizontal flange portion being spaced underneath the door and extending toward the door track, said threshold and door track arrangement providing for a weather-free seal between the threshold and door portions of the car.

6 Claims, 6 Drawing Figures

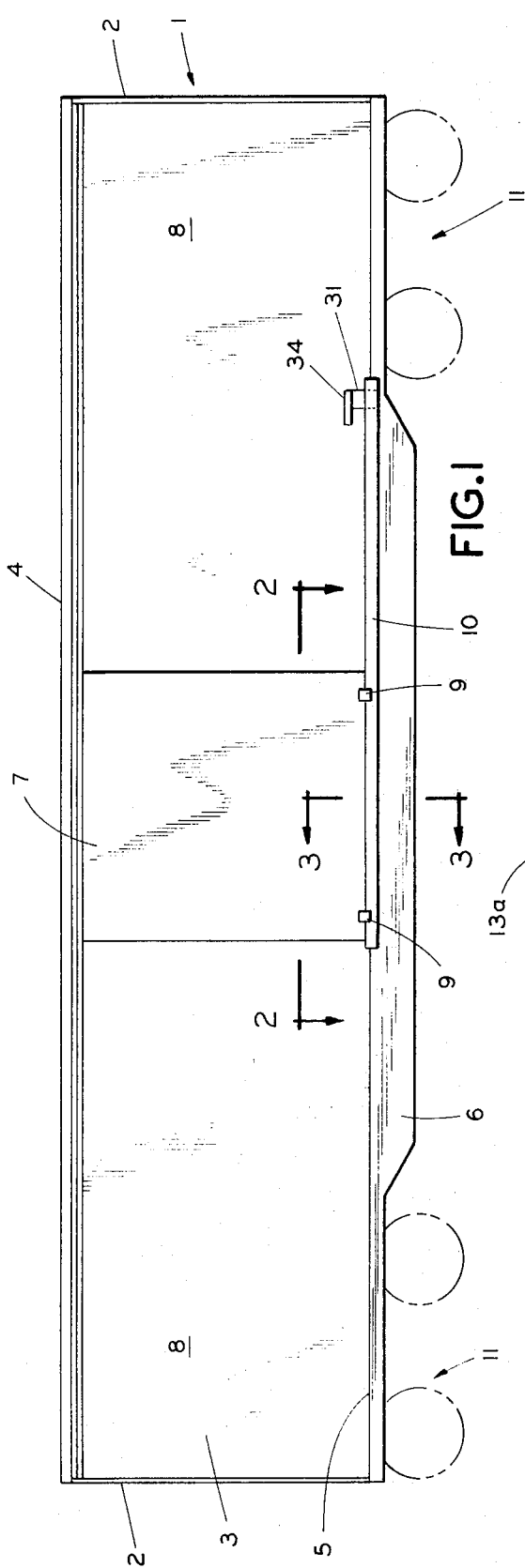
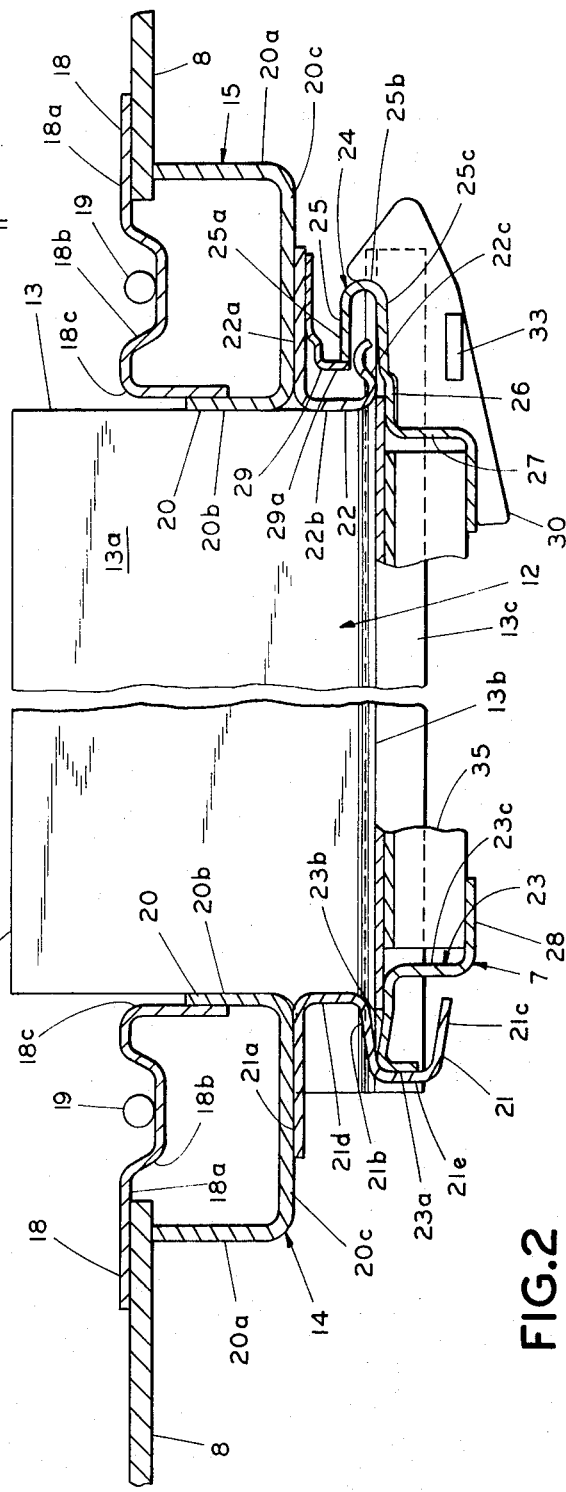
FIG.1
FIG.2

RAILROAD FREIGHT CAR DOOR TRACK AND THRESHOLD DESIGN

BACKGROUND OF THE INVENTION

1. Field of the Invention

This invention relates to railroad freight cars and, in particular, to railroad box cars provided with sliding doors and the sealing relation between the door and the opening or entrance.

2. Description of the Prior Art

Heretofore it has been known to provide for a sealing arrangement between the door and the door entrance of the railroad car but what the applicant's invention accomplishes is to provide an adequate seal between the door threshold and the bottom part of the door.

SUMMARY

It is, therefore, a general object, purpose and advantage of the instant invention to provide for novel sealing arrangement between the sliding door of a railroad freight car of the box car type and between the box car threshold. More in particular, the threshold itself is used as a seal between the car entrance or opening and the car sliding door in that the threshold is provided with a depending plate portion and an out-turned horizontal flange that goes underneath the door to insure that foreign matter such as dirt, light moisture and the like cannot pass between the door and the threshold and into the interior of the car.

It is a further advantage, object and purpose of the invention to provide a threshold which has longitudinal end portions extending beyond the door opening to further insure a good seal, as aforesaid.

These and other objects will become apparent with reference to the following description, appended claims and attached drawings.

BRIEF DESCRIPTION OF THE DRAWINGS

FIG. 1 is an elevational side view of a railroad box car having sliding doors;

FIG. 2 is a plan sectional view taken along line 2—2 of FIG. 1;

DESCRIPTION OF THE PREFERRED EMBODIMENT

Figure 3:
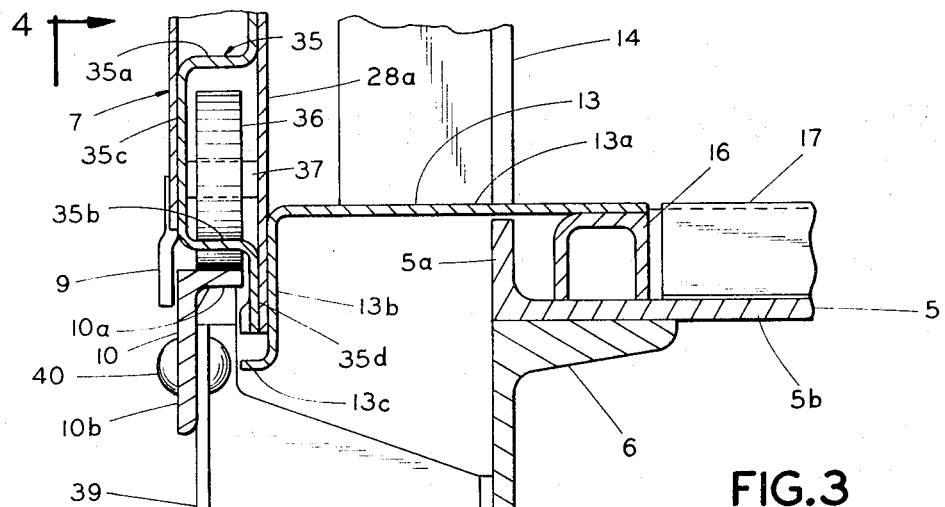
FIG. 3 is a cross sectional view taken along line 3—3 of FIG. 1.
Figure 4:
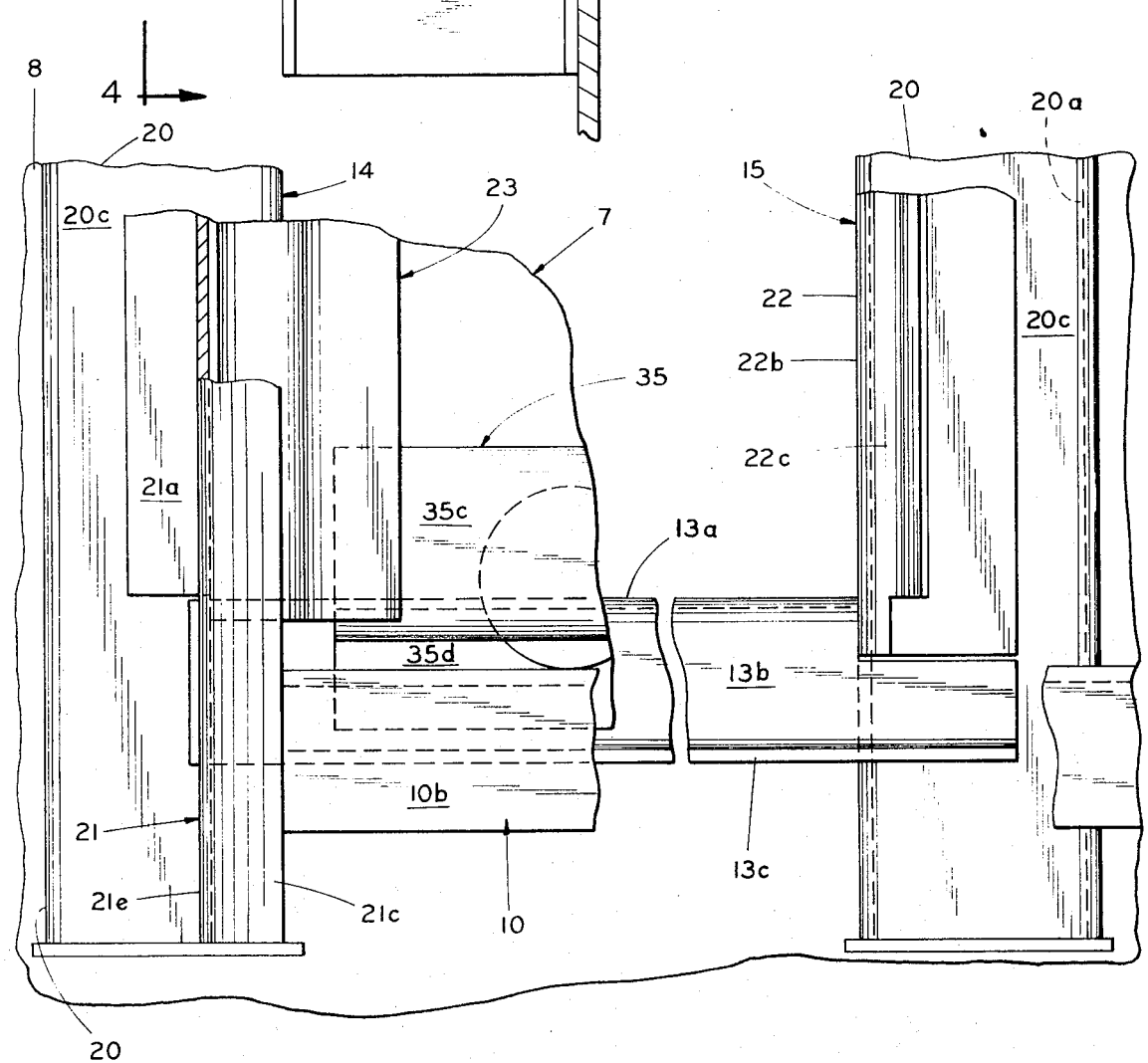
FIG. 4 is an enlarged partial side elevational view of the door and doorway.

With reference now to the drawings and in particular with reference to FIG. 1, there is shown a railroad box car 1 having ends 2, sides 3 and a roof 4. The car is provided with the usual side sill 5 and side sill reinforcement 6. The car is further provided with a sliding door 7 on each side of the car. The car is further provided with side sheeting 8. The sliding door is provided with door guides 9 which guide the door in its movement along the door track 10. The car sits on trucks 11.

Figure 5:
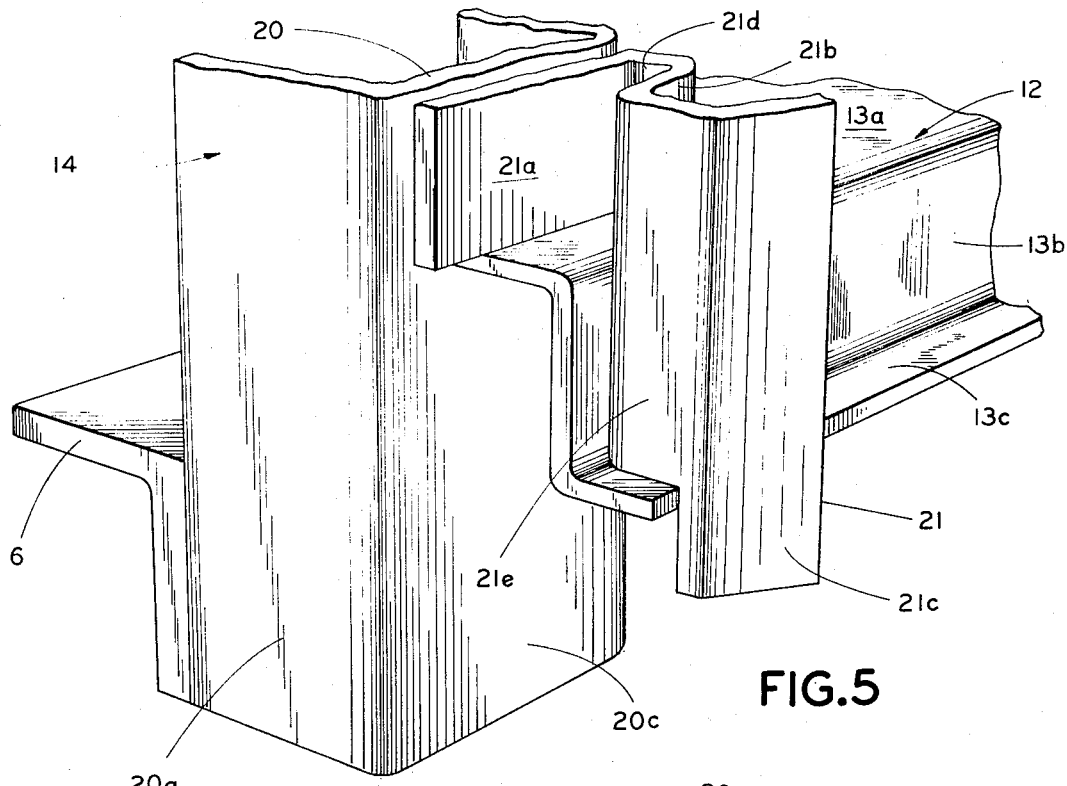
FIGS. 5 and 6 are elevational perspective longitudinal end view sections of the threshold.
Figure 6:
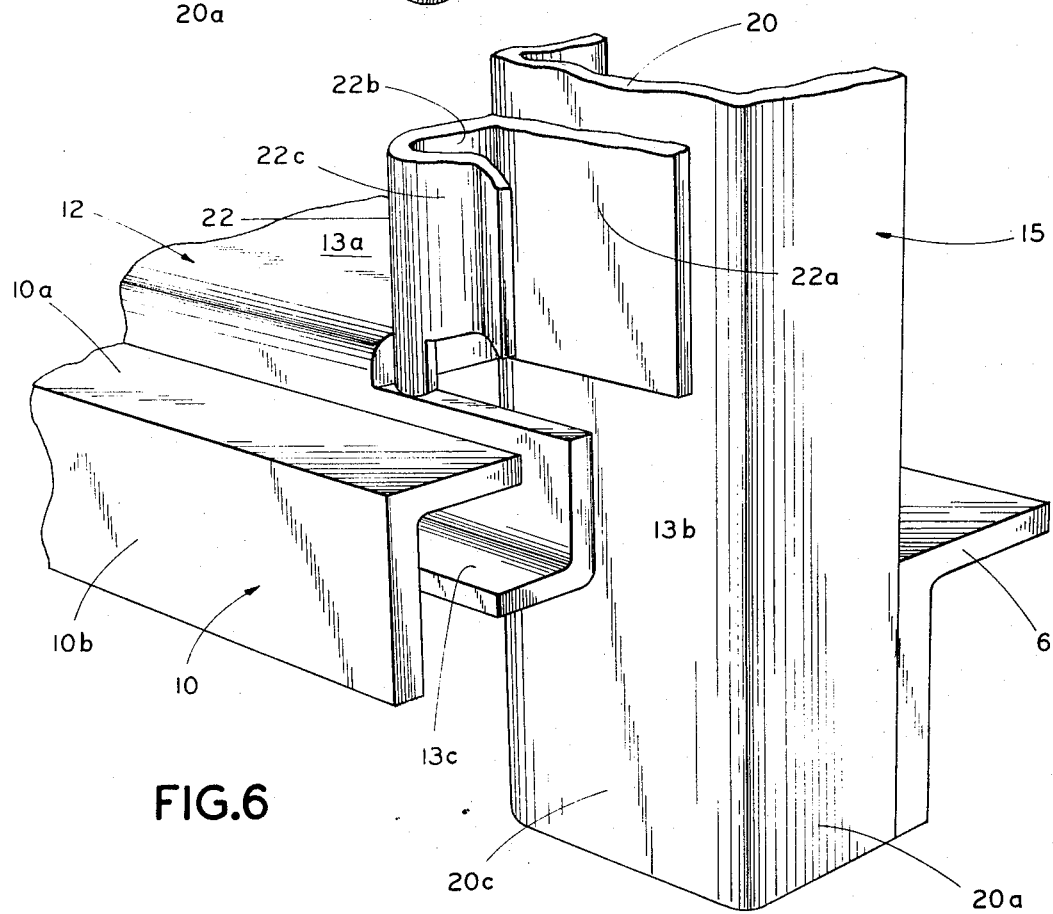

With reference now to the remaining FIGS., 2–6, there is shown a doorway or door entrance 12 in which is located a door threshold plate 13 which includes a flat horizontal portion 13a between the corner posts 14 and 15 and an outwardly extending downwardly depending vertical plate portion 13b which lies adjacent the inside edge of the door and from which depends out-turned horizontal end flange 13c. The inner end of the horizontal plate portion 13a rests upon the U-shaped threshold reinforcement member 16 rearwardly of which is located the floor or nailable steel sheet means 17, the inner portion 13a, the threshold reinforcement 16 and the floor 17 being supported on the side sill 5 which has a laterally outward vertical portion 5a and a lower horizontal laterally inwardly directed portion 5b. Each upright door post 14 or 15 is similar to the other and includes a laterally inward upright post section 18 having a sheet attachment part 18a, an outwardly protruding indented U-shaped portion 18b for receiving lading strap anchor 19 located within recess in post 18 and door post longitudinal and transverse L-shaped portion 18c which connects with the second door post plate 20 which is U-shaped having transverse flanges 20a and 20b and longitudinal portion 20c (see FIG. 2). Such a door post construction is generally a rectangular shaped hollow tube attached to the front post 18. On its longitudinal plate portion 20c is S-shaped front door stop 21. The front door stop is provided with upright generally longitudinal portions 21a, 21b and 21c and lateral portions 21d and 21e. The rear door post carries the rear door stop 22 which is generally J-shaped and has inner longitudinal arm 22a attached to plate portion 20c of plate 20 of the rear door post 15. The J-shaped rear door stop 22 is further provided with lateral flange portion 22b and longitudinal generally S-shaped end flange portion 22c, as seen in FIG. 2. The door 7 is provided with a front edge member 23 which has lateral arm 23a and general longitudinal arm 23b which nestles in the outer S-shaped portion of the front door stop 21 which includes front door stop parts 21b, 21e and 21c and the remaining portion of the front edge member 23 of the door includes lateral portion 23. The door 7 also has a rear edge part 24 which includes U-shaped portion 25 having flange portions 25a, 25b and 25c. The U-shaped portion 25 is connected in slight offset fashion with longitudinal extension portion 26 which is connected with lateral portion 27, the portions 23c and 27 being connected with one another by the front or face plate portion 28 of the door 7. A generally L-shaped baffle 29 is connected with the U-shaped rear door stop 22 and the baffle has its laterally projecting flange 29a engaging flange portion or arm 25a of the rear edge part 24 with the S-shaped portion 22c of the rear door stop 22 overlapping within the hook-shaped or U-shaped portion 25 of the rear door edge 24. Located at the rear door edge 24 is the door back stop 30 (FIG. 2) which engages the bumper back stop 31 (see FIG. 1) terminating rear movement of the door, and door catch 33 (FIG. 2) mounted on door back stop 30 catches or locks with the flipper or door latch 34 (FIG. 1) on the car. The door is further provided with a bottom edge assembly 35 which includes upper and lower laterally extending horizontal portions 35 and 35b and outer vertical portion 35c and lower vertical portion 35d which rests against the inner door face 28a which abuts against the vertical plate portion 13b of the threshold 13. The door guides 9 depend from the outer door face 28 of the door 7, as best seen in FIG. 3. In order to provide a good seal by the threshold plate 13 its longitudinal end portions extend beyond inner facings of and the posts as illustrated by the perspective views of FIGS. 5 and 6.

Disposed within lower or door bottom edge assembly is the roller 36 carried by roller shaft 37 journaled in the front and inner faces 28 and 28a, the roller engaging and resting on angle-shaped door track 10 having horizontal arm 10a and vertical arm 10b attached to track bracket 39 by bolt 40 whereby the door roller is guided on the door track, there being a plurality of such rollers to allow movement of the door in the door track 10. The track bracket 29 is attached to the side sill reinforcement 6.

The foregoing description and drawings merely expalin and illustrate the invention and the invention is not limited thereto, except insofar as the appended claims are so limited, as those skilled in the art who have the disclosure before them will be able to make modifications and variations therein without departing from the scope of the invention.

What is claimed is:

1. In a railroad car having a side door opening defined by a pair of door posts, a door, and a track disposed along the car and supporting the door for movement between an open position away from the door opening and a closed position over the door opening, a threshold arrangement comprising:

horizontal threshold plate means disposed between the door posts and having an end extending out of said door opening toward said door in the closed position;

vertical threshold plate means depending from the outwardly extending end of said horizontal plate means and extending along said door in the closed position to a level below said door; and generally horizontal flange means extending from said vertical threshold plate means beneath said door in the closed position for preventing the passage of foreign matter between the door and the vertical threshold plate means into the car.

2. The invention according to claim 1; and said vertical threshold plate means and said generally horizontal flange means having longitudinal end portions which extend beyond the door opening to either side thereof.

3. The invention according to claim 2; and a door stop disposed on each of said longitudinal end portions and attached to a respective side post.

4. The invention according to claim 3; and one of said door stops having an upright, generally longitudinal portion extending below said generally horizontal flange means.

5. The invention according to claim 1; and said horizontal threshold plate means, said vertical threshold plate means and said generally horizontal flange means comprising an integrally formed structure.

6. The invention according to claim 1; and said railroad car including a side sill means disposed beneath said horizontal threshold plate means; and a substantially U-shaped threshold reinforcement member disposed on the side sill means and supporting said horizontal threshold plate means thereon.

* * * * *